Feb. 3, 1970  P. R. KURZHALS  3,493,194
SPACECRAFT EXPERIMENT POINTING AND ATTITUDE CONTROL SYSTEM
Filed July 27, 1967  5 Sheets-Sheet 1

INVENTOR
PETER R. KURZHALS

BY

ATTORNEYS

United States Patent Office 3,493,194
Patented Feb. 3, 1970

3,493,194
SPACECRAFT EXPERIMENT POINTING AND ATTITUDE CONTROL SYSTEM
Peter R. Kurzhals, Newport News, Va., assignor to the United States of America as represented by the Administrator of the National Aeronautics and Space Administration
Filed July 27, 1967, Ser. No. 656,995
Int. Cl. B64g 1/00
U.S. Cl. 244—1                                    14 Claims

ABSTRACT OF THE DISCLOSURE

This invention is an attitude control system for use on a spacecraft. A double-gimbaled moment gyro unit is mounted along each of the three orthogonal axes of the spacecraft. Each unit has an inner and an outer gimbal which are controlled by a control system to provide spacecraft stabilization. The control system senses movement of the craft, analyzes the movement and controls the application of power to the gimbals to compensate for the movement. In addition, the control system activates desaturation jets when the gyro units become saturated.

---

The invention described herein was made by an employe of the United States Government and may be manufactured and used by or for the Government for governmental purposes without payment of any royalties thereon or therefor.

Background of the invention

A spacecraft moves about three axes known as the pitch, roll and yaw axes or the X, Y and Z axes. Various internal and external conditions cause the spacecraft to randomly move about any or all of these axes, and in most environments random movement is undesirable. For example, if the spacecraft is a scientific satellite, it is necessary to keep many of the satellite's scientific sensors pointed in a constant direction so that data obtained by the sensors is meaningful. Alternatively, if the spacecraft is a manned vehicle, it is necessary to compensate for movements of the crew (which create movements of the craft) so that reliable observations and vehicle control can be maintained. Hence, it is necessary to sense the rate and direction of the spacecraft's movement and to provide a means to compensate for that movement.

In addition to attitude stabilization, it is often necessary to intentionally change from one attitude to a second attitude. This attitude or pointing change is necessary in a scientific satellite so that observation and sensing instruments can be used along desired axes. Or, in a manned spacecraft pointing changes are necessary so that photographs can be made and experiments can be performed in desired directions. After the attitude change has been accomplished, the spacecraft must again be stabilized for the reasons stated above.

From the foregoing it will be appreciated that the spacecraft's stabilization and attitude change device must operate over a wide range. Large torques must be created to vary the attitude of the spacecraft from one attitude to a second attitude. In addition, small torques must be generated to compensate for movement of the spacecraft from the desired attitude; i.e., for stabilization.

Various prior art systems have been proposed to accomplish the control and stabilization of a spacecraft. Pulse jet systems with jets located on the exterior of the spacecraft and controlled by the spacecraft's control system have been utilized in some environments. However, pulse jet systems have certain disadvantages. Specifically, a pulse jet system requires fuel for the jets. While the utilization of fuel on short term missions is not a prohibitive factor, it becomes a prohibitive factor when the mission is of long duration. That is, the increase in length of the spacecraft's misison increases the amount of fuel necessary to make the stabilization and control jets operative for the length of the mission.

Gyro systems have also been proposed as a means to stabilize and change the attitude of a spacecraft. While prior art gyro systems overcome the fuel problem of pulse jet systems they also have presented problems. Specifically, prior art gyro control systems for controlling the attitude and stabilization of a spacecraft have been large and unwieldy, making them undesirable for use on a spacecraft where the size and weight of all systems is critical. In addition, prior art gyro systems have been mechanically very complex when a wide range of accuracies and control maneuvers were to be achieved.

Therefore, it is an object of this invention to provide a new and improved stabilization and attitude control system.

It is also an object of this invention to provide a new and improved stabilization and attitude control system for a spacecraft.

It is another object of this invention to provide a new and improved gyro attitude and stabilization control system for use on a spacecraft.

It is still another object of this invention to provide a new and improved control system for controlling gyros located along the three orthogonal axes of a spacecraft.

It is a further object of this invention to provide a new and improved attitude and stabilization control system for use on a spacecraft that is lightweight, reliable, and mechanically and electronically simple.

Summary of the invention

In accordance with a principle of this invention, a new and improved stabilization and attitude control system for a spacecraft is provided. A moment gyro unit is mounted along each of the three orthogonal axes of the spacecraft. Each unit has an inner and an outer gimbal which are controlled by a control system to stabilize the spacecraft's attitude. Appropriate sensing devices sense variations in the attitude of the spacecraft. These sensed variations are interpreted by the control system and utilized to control the application of power to the gimbals of the gyro torquers.

In accordance with a further principle of this invention, appropriate sensing means are mounted in the gyro units to sense the location and rotation of the gimbals. These sensed signals are combined in the control system with sensed signals representing the spacecraft's attitude and rate of movement. Control signals are generated by the control system and applied to the gimbals of the gyro units to change the attitude of the craft or to stabilize its attitude.

In accordance with yet another principle of this invention, the control system uses a guidance computer that determines the rate and attitude errors of the spacecraft with respect to a desired attitude by the use of the directional cosine or Euler angle signals for the X, Y and Z axes of the spacecraft and processes these signals in combination with the rate signals from the three gyro units to provide error signals that are utilized to control the units.

In accordance with still another principle of the invention, a desaturization means is provided for controlling desaturation jets when the gimbals of the moment gyro units have been saturated. That is, when the gimbals have reached an inoperative position due to the alignment of the disturbance torque and the unit spin axes, they are saturated. When this condition occurs, the control recognizes it and applies an energization signal to the appropriate desaturation jets to desaturate the gyro torquing system.

It will be appreciated by those skilled in the art and others that the torquing system of the invention is relatively simple when compared with prior art devices. The system generally comprises three moment gyro torquers located along the three orthogonal axes of the spacecraft and a control system for controlling the energization of the torquers. The control system includes sensors for sensing the attitude and rate of movement of the spacecraft and sensors mounted on the gyro units for sensing the location and rate of movement of the gyro's gimbals. The combination of these signals provides a control signal that is utilized to control the application of power to the gimbals. In addition, a desaturation means is provided for desaturating the gyro units when they have become saturated.

It will also be appreciated that the system of the invention is readily mechanized, has inherent redundancy, and provides a wider range of attitude control for space vehicles than prior art gyro systems. In addition, the three-gyro configuration with its essentially spherical momentum enevelope allows lower launch weights and volumes than prior art systems which have used an equal or larger number of single or double gimballed gyros for equivalent control tasks. Hence, the invention is less complex and more redundant and has better reliability than prior art systems. In addition, it has lower weight and volume.

Brief description of the invention

The foregoing objects and many of the attendant advantages of this invention will become more readily appreciated as the same becomes better understood by reference to the following detailed description when taken in conjunction with the accompanying drawings wherein.

Description of the preferred embodiments

Figure 1:
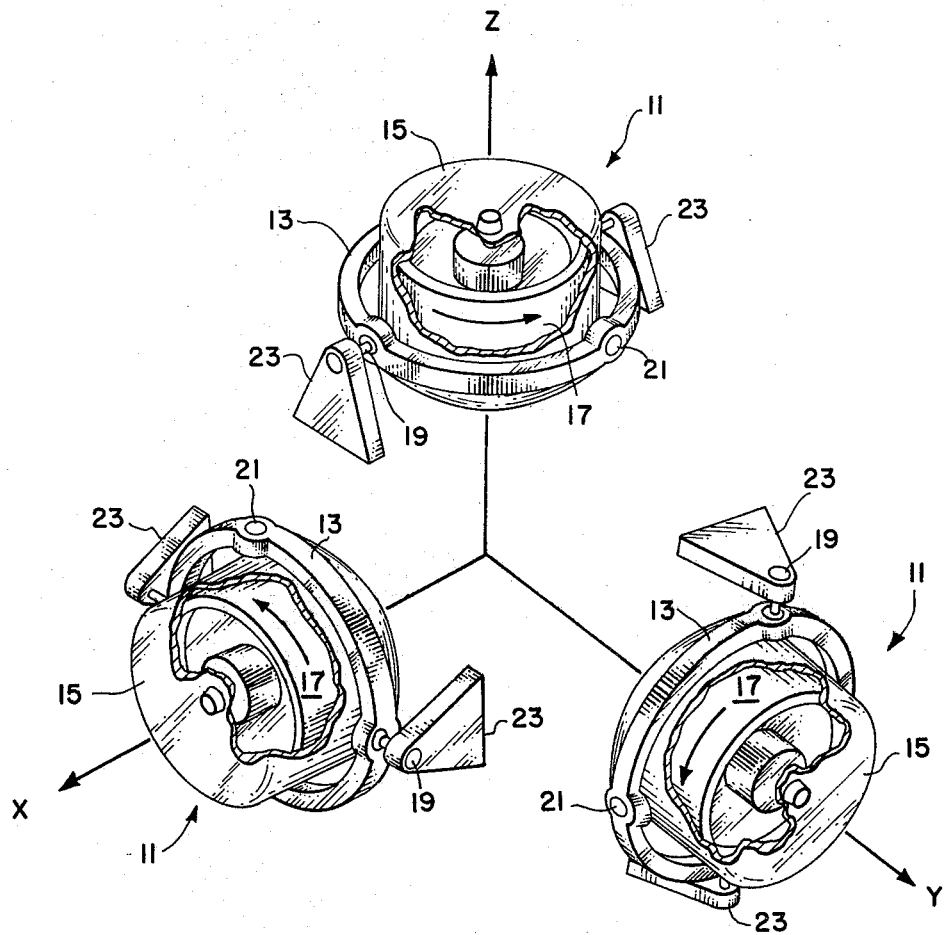
FIG. 1 is a schematic diagram illustrating three gyro units located along the three orthogonal axes of the spacecraft.

FIG. 1 illustrates schematically the location of three moment gyro units 11 along the three orthogonal axes of the spacecraft. For purposes of clarity, the structure of the spacecraft has not been illustrated.

Each gyro unit illustrated in FIG. 1 includes an outer gimbal 13, an inner gimbal 15 and a flywheel 17. Operatively connected to each outer gimbal is an outer gimbal torquer 19 and operatively connected to each inner gimbal is an inner gimbal torquer 21. The outer gimbal torquer 19 is illustrated as attachable to a spacecraft by a suitable mounting frame means 23.

Figure 2:
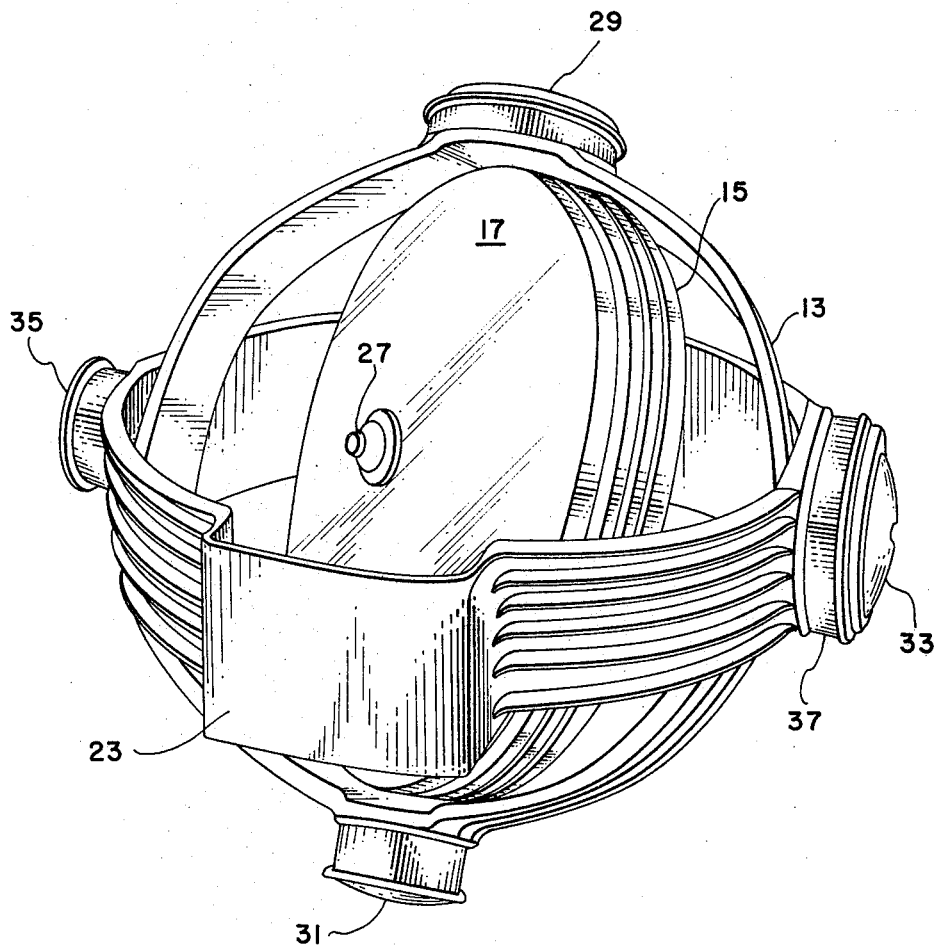
FIG. 2 is a diagram illustrating a moment gyro unit suitable for use in the invention.

FIG. 2 illustrates more completely one of the moment gyros of FIG. 1. Located at approximately the center of the structure is a flywheel drive motor and tachometer 27 connected to the flywheel 17. Located around the periphery of the flywheel 17 is a flywheel housing and the inner gimbal 15. Torquers and sensors are located on opposite sides of the inner gimbal 15. Specifically, located on the upper end of the inner gimbal as ilustrated in FIG. 2 is an inner gimbal torquer 29. Located at the lower end of the inner gimbal 15 is an inner gimbal tachometer and angular potentiometer 31. The inner gimbal tachometer senses the rate of movement of the inner gimbal while the inner gimbal angular potentiometer determines the location of the inner gimbal. Hence, the rate and attitude of the inner gimbal are determined. Mechanical gimbal stops (not shown) are located on both ends of the inner gimbal 15.

The outer gimbal is located about the inner gimbal and also has a torquer and sensor located on opposite sides. An outer gimbal torquer 33 is located on the right of the outer gimbal as viewed in FIG. 2. An outer gimbal tachometer and angular potentiometer 35 is located on the left of the outer gimbal 13 as viewed in FIG. 2. The outer gimbal tachometer and angular potentiometer is utilized to sense the rate and the attitude of the outer gimbal in the manner that the inner gimbal tachometer and angular potentiometer senses the rate and location of the inner gimbal.

It will be appreciated that the gyro illustrated in FIG. 2 is a double gimbal gyro including a means for driving the flywheel and a means for torquing the inner and outer gimbals. In addition, means are provided for sensing the rate of flywheel motion and means are provided for sensing the rate of movement and the attitude of both the inner and outer gimbals. Preferably, slip rings are provided near the outer gimbal torquer 33 so that power can be applied to the inner gimbal and the flywheel drive motor.

Figure 3:
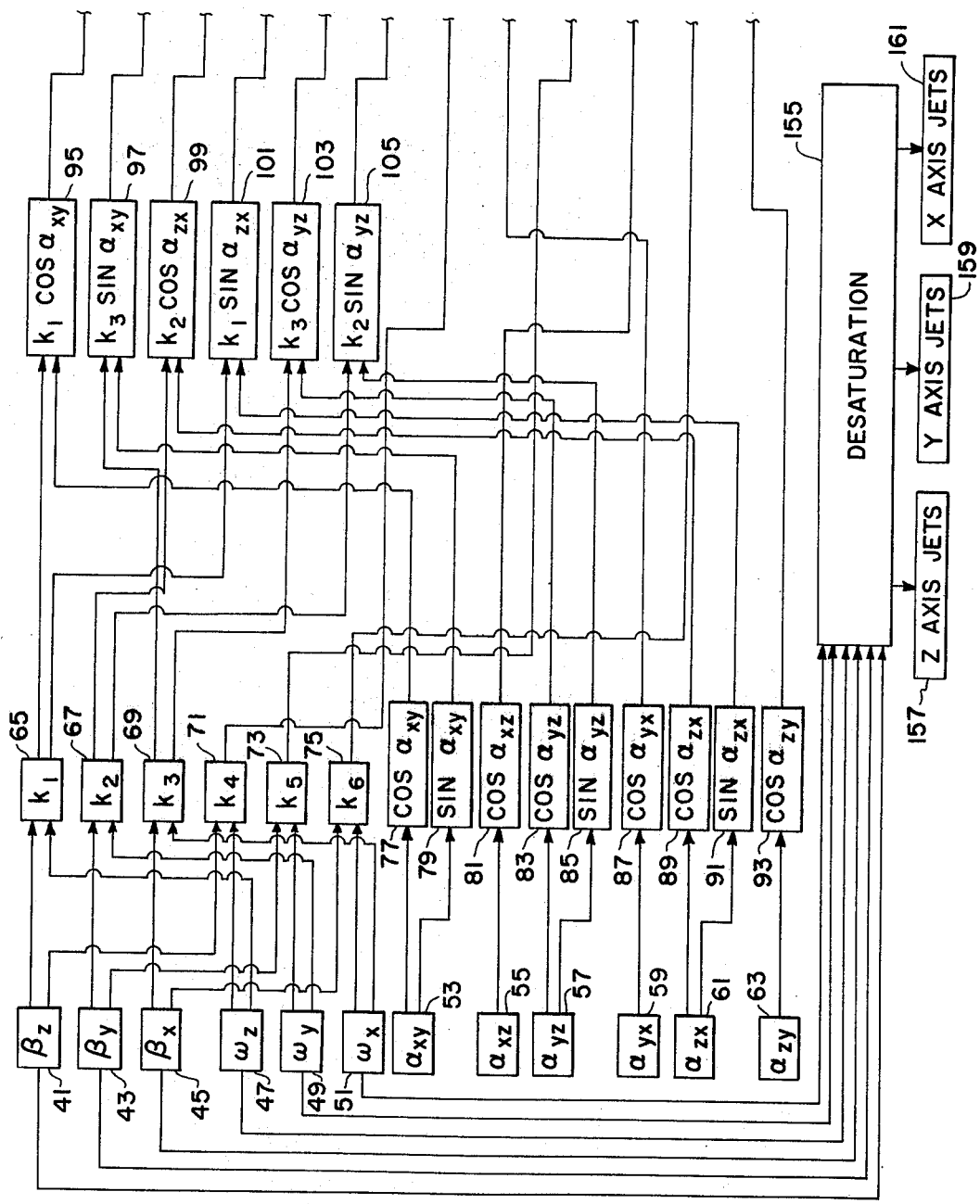
FIGS. 3 and 3A are a block diagram illustrating a control system suitable for use in the invention.
Figure 3A:
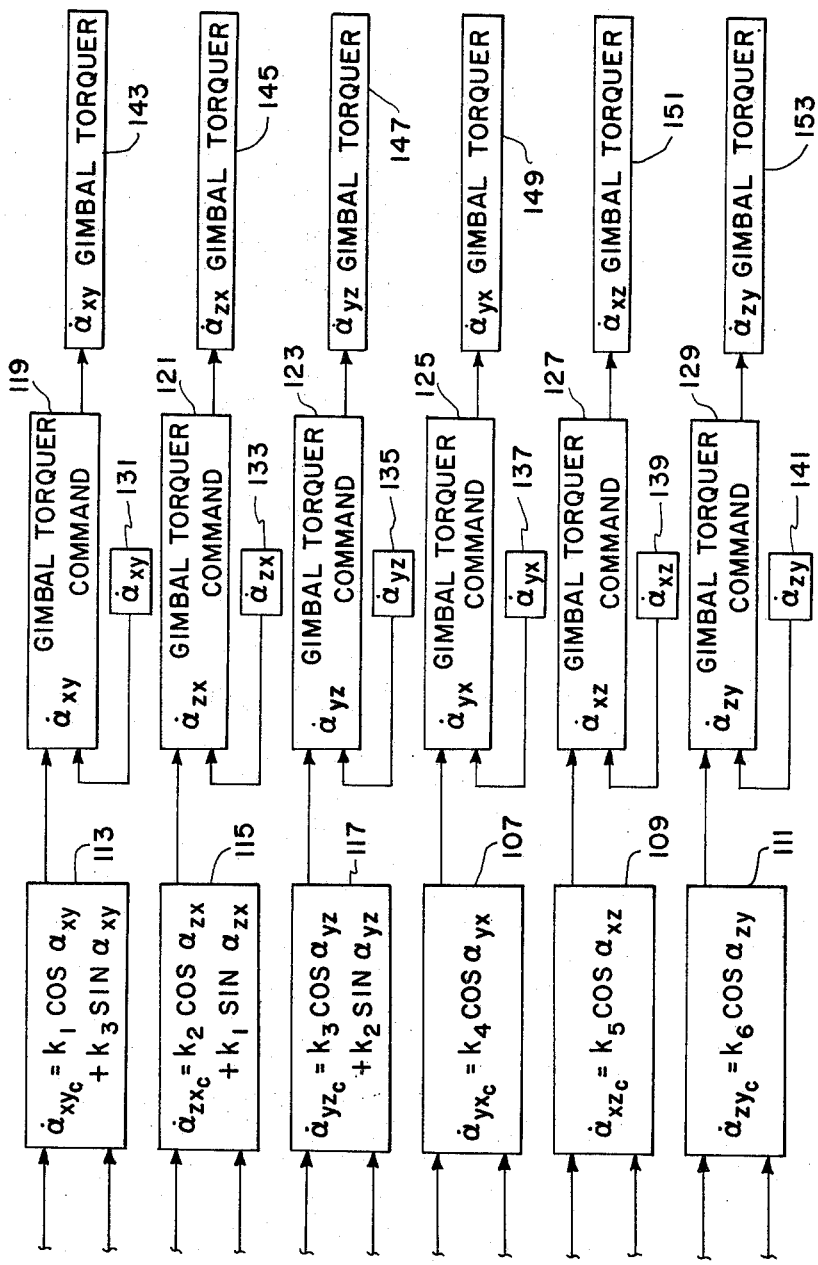

FIGS. 3 and 3A are a block diagram illustrating the control system of the invention. For ease of discussion, the following terminology is used: $\beta$ is the Euler angular attitude error or the direction cosine of the spacecraft with respect to a fixed attitude; $\omega$ is the rate of change of the attitude of the spacecraft; $\alpha$ is the gimbal angle signal; $k$ is a variable gain function signal; and $\dot{\alpha}$ is the desired gimbal rate signal. In addition, the various subscripts utilized refer to the three orthogonal axes of the spacecraft as illustrated in FIG. 1.

FIGS. 3 and 3A generally comprise: three angle error signal processing networks 41, 43 and 45 for obtaining the $\beta_z$, $\beta_y$ and $\beta_x$ signals; three rate error signal processing networks 47, 49 and 51 for obtaining the $\omega_z$, $\omega_y$ and $\omega_x$ signals; six angular potentiometers 53, 55, 57, 59, 61 and 63 for obtaining the $\alpha$ angle signals for the inner and outer gimbals of the three gyros; six amplifiers and adders 65, 67, 69, 71, 73 and 75 for generating the $k$ variable gain function signals; nine trigonometric function generators 77, 79, 81, 83, 85, 87, 89, 91 and 93 for generating certain trigonometric angle functions; nine multipliers 95, 97, 99, 101, 103, 105, 107, 109 and 111 for multiplying incoming signals; three additional amplifiers and adders 113, 115 and 117; six gimbal torquer command networks 119, 121, 123, 125, 127 and 129; six gimbal tachometers 131, 133, 135, 137, 139 and 141; and six gimbal torquers 143, 145, 147, 149, 151 and 153.

The three angle error signal processing networks 41, 43 and 45 and the three rate error signal processing networks 47, 49 and 51 are connected to suitable sensors (not shown) for sensing angle and rate error signals. The sensors may be optical devices, magnetic devices, or any other suitable attitude and rate sensing device.

The $\beta_z$ signal is combined with the $\omega_z$ signal in the first amplifier and adder 65 to obtain a $k_1$ signal. The $\beta_y$ signal is combined with the $\omega_y$ signal in the second amplifier and adder 67 to obtain a $k_2$ signal and the $\beta_x$ signal is combined with the $\omega_x$ signal in the third amplifier and adder 69 to obtain a $k_3$ signal. The $\beta_z$ signal is also combined with the $\omega_z$ signal in the third amplifier and adder 71 to obtain a $k_4$ signal. Similarly, the $\beta_y$ signal is also combined with the $\omega_y$ signal in the fifth amplifier and adder 73 to obtain a $k_5$ signal and the $\beta_x$ signal is also combined with the $\omega_x$ signal in the sixth amplifier 75 to obtain a $k_6$ signal.

An $\alpha_{xy}$ signal is generated by the first angular potentiometer 53 and is applied to the first and second trigonometric generators 77 and 79. The first trigonometric generator 77 generates a cos $\alpha_{xy}$ signal and the second trigonometric generator 79 generates a sin $\alpha_{xy}$ signal. The second angular potentiometer 55 generates an $\alpha_{xz}$ signal and applies it to the third trigonometric function generator 81. The third trigonometric function generator generates a cos $\alpha_z$ signal.

The third angular potentiometer 57 generates an $\alpha_{yz}$ signal and applies it to the fourth and fifth trigonometric function generators 83 and 85. The fourth trigonometric generator generates a cos $\alpha_{yz}$ signal and the fifth trigonometric function generator 85 generates a sin $\alpha_{yz}$ signal. The fourth angular potentiometer 59 generates an $\alpha_{yx}$ signal and applies it to the sixth trigonometric function generator 87. The sixth trigonometric function generator 87 generates a cos $\alpha_{yx}$ signal.

The fifth angular potentiometer 61 generates an $\alpha_{zx}$ signal and applies it to the seventh and eighth trigonometric function generators 89 and 91. The seventh trigonometric function generator generates a cos $\alpha_{zx}$ signal and the eighth trigonometric function generator generates a sin $\alpha_{zx}$ signal. The sixth angular potentiometer 63 generates an $\alpha_{zy}$ signal and applies it to the ninth trigonometric function generator 93 which generates a cos $\alpha_{zy}$ signal.

The $k_1$ signal is multiplied by the cos $\alpha_{xy}$ signal in the first multiplier 95 to obtain a $k_1$ cos $\alpha_{xy}$ signal. The $k_1$ signal is also multiplied by the sin $\alpha_{zx}$ signal in the fourth multiplier 101 to obtain a $k_1$ sin $\alpha_{zx}$ signal. The $k_2$ signal is multiplied by the cos $\alpha_{zx}$ signal in the third multiplier 99 to obtain a $k_2$ cos $\alpha_{zx}$ signal. The $k_2$ signal is also multiplied by the sin $\alpha_{yz}$ signal in the sixth multiplier 105 to obtain a $k_2$ sin $\alpha_{yz}$ signal.

The $k_3$ signal is multipled by the sin $\alpha_{xy}$ signal in the second multiplier 97 to obtain a $k_3$ sin $\alpha_{xy}$ signal. The $k_3$ signal is also multiplied by the cos $\alpha_{yz}$ signal in the fifth multiplier 103 to obtain a $k_3$ cos $\alpha_{yz}$ signal.

The $k_4$ signal is multiplied by the cos $\alpha_{yx}$ signal in the seventh multiplier 107 to obtain an $\dot{\alpha}_{yz_C} = k_4$ cos $\alpha_{yx}$ signal and the $k_5$ signal is multiplied by the cos $\alpha_{xz}$ signal in the eighth multiplier 109 to obtain an $\dot{\alpha}_{xz_C} = k_5$ cos $\alpha_{xz}$ signal. In addition, the $k_6$ signal is multiplied by the cos $\alpha_{zy}$ signal in the ninth multiplier 111 to obtain an $$\dot{\alpha}_{zy_C} = k_6 \cos \alpha_{zy}$$

signal.

The outputs of the first and second multiplier 95 and 97 are applied to the input of the first of the additional amplifiers and adders 113 to obtain an $$\dot{\alpha}_{xy_C} = k_1 \cos \alpha_{xy} + k_3 \sin \alpha_{xy}$$

signal. The outputs from the third and fourth multipliers 99 and 101 are combined in the second of the additional amplifiers and adders 115 to obtain an $$\dot{\alpha}_{zx_C} = k_2 \cos \alpha_{zx} + k_1 \sin \alpha_{zx}$$

signal. Further, the outputs from the fifth and sixth multipliers are combined in the third of the additional amplifiers and adders 117 to obtain an $$\dot{\alpha}_{yz_C} = k_3 \cos \alpha_{yz} + k_2 \sin \alpha_{yz}$$

signal.

The $\dot{\alpha}_{xy_C}$ output from the first additional amplifier and adder 113 is connected to one input of the first gimbal torquer command 119. The output from the first gimbal tachometer 113 which is an $\dot{\alpha}_{xy}$ signal is applied to the second input of the first gimbal torquer command 119. The first gimbal torquer command 119 subtracts $\dot{\alpha}_{xy}$ from $\dot{\alpha}_{xy_C}$ and generates a control signal ($\dot{\alpha}_{xy_C} - \dot{\alpha}_{xy}$) that is applied to the first gimbal torquer 143. The first gimbal torquer controls the $\dot{\alpha}_{xy}$ gimbal of the three moment gyros. Similarly, the $\dot{\alpha}_{zx_C}$ output from the second of the additional amplifiers and adders 115 is applied to one input of the second gimbal torquer command 121. The output from the second gimbal tachometer 133 is an $\dot{\alpha}_{zx}$ signal and is applied to the second input of the second gimbal torquer command 121. These two signals are compared and a control signal ($\dot{\alpha}_{zx_C} - \dot{\alpha}_{zx}$) is applied by the second gimbal torquer command to the second gimbal torquer 145. The second gimbal torquer controls the $\dot{\alpha}_{zx}$ gimbal.

The $\dot{\alpha}_{yz_C}$ output from the third of the three additional amplifiers and adders 117 is applied to one input of the third gimbal torquer command 123. The second input to the third gimbal torquer command is obtained from the third gimbal tachometer 135 which generates an $\dot{\alpha}_{yz}$ signal. The two signals are compared and a control signal ($\dot{\alpha}_{yz_C} - \dot{\alpha}_{yz}$) is applied by the third gimbal torquer command 123 to the third gimbal torquer 147 to control the $\dot{\alpha}_{yz}$ gimbal.

The $\dot{\alpha}_{yx_C}$ output from the seventh multipler 107 is applied to one input of the fourth gimbal torquer command 125 and the output of the fourth gimbal tachometer 137 is applied to the second input of the fourth gimbal torquer command. The output of the fourth gimbal tachometer is an $\dot{\alpha}_{yz}$. The output from the fourth gimbal torquer command 125 is a control signal ($\dot{\alpha}_{yx_C} - \dot{\alpha}_{yx}$) that is applied to the fourth gimbal torquer 149 to control the $\dot{\alpha}_{yx}$ gimbal. Similarly, the $\dot{\alpha}_{xz_C}$ output of the eighth multiplier 109 is connected to one input of the fifth gimbal torquer command 127 and the output of the fifth gimbal tachometer 139 is connected to the second input of the fiffh gimbal torquer command. The output of the fifth gimbal tachometer is an $\dot{\alpha}_{xz}$ signal. The control output ($\dot{\alpha}_{xz_C} - \dot{\alpha}_{xz}$) of the fifth gimbal torquer command controls the fifth gimbal torquer 151. The fifth gimbal torquer controls the $\dot{\alpha}_{xz}$ gimbal.

Finally, the $\dot{\alpha}_{zy_C}$ output from the ninth multiplier 111 is applied to one input of the sixth gimbal torquer command 129 and the $\dot{\alpha}_{zy}$ output from the sixth gimbal tachometer 141 is applied to the second input of the sixth gimbal torquer command. The control output ($\dot{\alpha}_{zy_C} - \dot{\alpha}_{zy}$) of the sixth gimbal torquer controls the sixth gimbal torquer 153. The sixth gimbal torquer controls the $\dot{\alpha}_{zy}$ gimbal.

It will be appreciated from the description of the gyro system illustrated in FIG. 1 that for three double-gimballed gyros six control signals must be derived. These are the six control signals from the six gimbal torquer commands.

In operation, attitude and stabilization control is achieved by controlling the variable gain networks that generate the $k_1$ to $k_6$ signals. Specifically, the $\beta$ and $\omega$ signals are fed to the first set of amplifiers and adder. Each $\beta$ signal and each $\omega$ signal is mulitiplied by a predetermined constant K. That is, the $\beta$ signal applied to each amplifier and adder is multiplied by one constant K and the $\omega$ signal is multiplied by a second constant K. The amplifier and adder then adds the results to give the variable gain functions $k$. The variable gain functions can thus be written as:

$$k_1 = K_1 \beta_z + K_2 \omega_z$$
$$k_2 = K_3 \beta_y + K_4 \omega_y$$
$$k_3 = K_5 \beta_x + K_6 \omega_x$$
$$k_4 = K_7 \beta_z + K_8 \omega_z$$
$$k_5 = K_9 \beta_y + K_{10} \omega_y$$
$$k_6 = K_{11} \beta_x + K_{12} \omega_x$$

where the constant gain factors $K_1$–$K_{12}$ are selected to be proportional to the spacecraft's inertias and desired damping characteristics.

The angular potentiometers generate the gimbal angle signals which are designated as the $\alpha$ signals in FIG. 3. $\alpha_{xy}$ and $\alpha_{xz}$ are the outer and inner gimbal angle readouts for the X-axis gyro; $\alpha_{yz}$ and $\alpha_{yx}$ are the outer and inner angle readouts for the Y-axis gyro; and $\alpha_{zx}$ and $\alpha_{zy}$ are the outer and inner gimbals angle readouts for the Z-axis gyro. The gimbal angle signals are fed to the appropriate trigonometric function generators which generate trigonometric function signals in accordance with the gimbal angle signals. These trigonometric function signals are multiplied by the $k_1$–$k_6$ variable gain signals in the multipliers to generate the output signals designated in the blocks representing the various multipliers illustrated in FIG. 3. In addition, the outputs from the first six multipliers are suitably added in the second set of amplifiers and adders. The resultant $\dot{\alpha}_c$ signals are the desired gimbal rate signals.

The actual gimbal rate signals are read by the gimbal tachometers and the tachometer outputs are combined with the desired gimbal rate signals in the gimbal torquer command networks.

The outputs of the gimbal torquer command networks are the gimbal torquer command signals and are used to actuate the gimbal torquers. Actuation of the gimbal torquers by the system illustrated in FIG. 2 thus produces the desired reaction control torques for the spacecraft. That is, the desired signals are combined in the gimbal torquer commands with the actual signals to determine error signals which are then utilized to produce desired reaction control torques.

In addition to utilizing the system illustrated in FIG. 3 for stabilization, it will be appreciated that it can also be utilized to control the pointing of the spacecraft. Specifically, by combining the actual spacecraft attitude and rate signals generated by the $\beta$ and $\omega$ sensors with desired attitude and rate signals, the spacecraft will move to a desired attitude. More specifically, an electronic system can be provided for comparing the desired and actual rate and attitude signals. The error signals that result from this comparison are then applied to the amplifiers and adders that generate the $k_1$–$k_6$ signals. These error signals then are applied to the gimbal torquer command networks and to the gimbal torquers. The gimbal torquers will then cause the spacecraft to achieve the desired attitude and rate.

Figure 4:
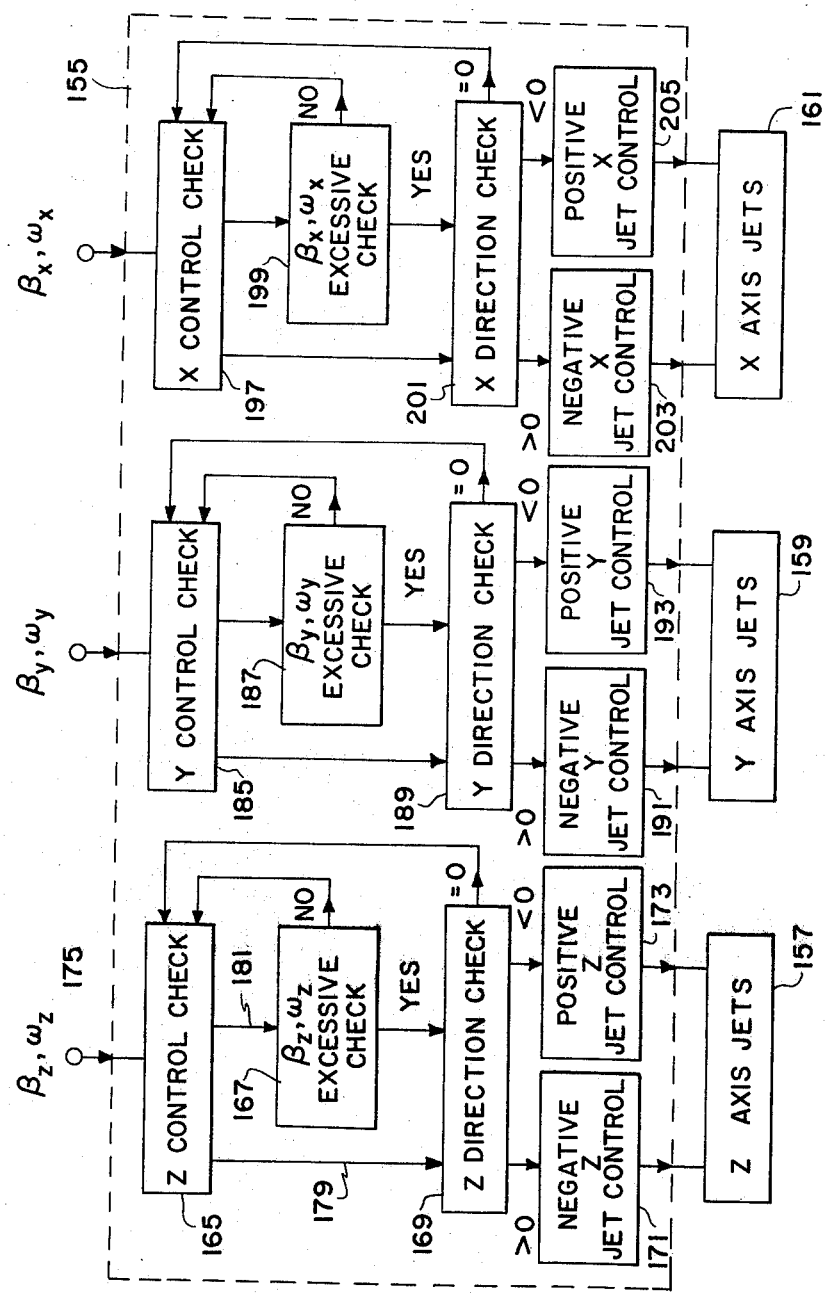
FIG. 4 is a block diagram illustrating a desaturization control system suitable for use in the invention.

In addition to controlling the gimbal torquers, the system illustrated in FIG. 3 also generally illustrates the desaturation system. Specifically, a desaturation control network 155, Z-axis jets 157; Y-axis jets 159 and X-axis jets 161 are illustrated in FIG. 3. The $\beta$ output signals from the attitude error signal processing networks 41, 43 and 45 and the $\omega$ outputs from the rate error signal processing networks 47, 49 and 51 are applied to the desaturation network 155. The desaturation network, as hereinafter described, detects these signals and, when a saturation condition occurs, controls the X, Y and Z axis jets so that the general torquing system is desaturated. FIG. 4 illustrates a suitable desaturation control network for use with the gimbal control system illustrated in FIG. 3.

FIG. 4 is a block diagram illustrating a desaturation control system 155 that includes three control networks for separately controlling the Z-axis jets 157, the Y-axis jets 159 and the X-axis jets 161. The Z-axis jets control network comprises a Z control check network 165, a $\beta_z$, $\omega_z$ excessive check network 167, a Z direction check 169, a negative Z jet control 171, and a positive Z jet control 173.

The Z control check network 165 receives the $\beta_z$, $\omega_z$ signals at an input terminal 175. The Z control check has two outputs, a fine mode output that passes along a line 179 and a coarse mode output that passes along a line 181. The fine mode output is applied directly to one input of the Z direction check 169 while the coarse mode output is applied to the $\beta_z$, $\omega_z$ excessive check network 167.

The $\beta_z$, $\omega_z$ excessive check has both Yes and No outputs. The No output line is applied to a first control input of the Z control check 165. The Yes output from the $\beta_z$, $\omega_z$ excessive check network is applied to a second input of the Z direction check.

The Z direction check 169 has three outputs. A greater-than-zero output that is applied to the negative Z jet control 171, a less-than-zero output that is applied to the positive Z jet control 173 and a zero output that is applied to a second control input of the Z control check 165. The output from the negative Z jet control 171 is applied to the negative jet of the Z-axis jets and the output of the positive Z jet control 173 is applied to the positive jet of the Z-axis jets 157. For a more complete disclosure of the desaturation system refer to pages 42–45 and 61–64 of NASA Technical Report R–247 (NASA TR R–247), A System for Inertial Experiment Pointing and Attitude Control, published August 1966.

In operation, the Z control check 165 receives the $\beta_z$, $\omega_z$ signals at the input terminal 175. The Z control check 165 checks if the system is operating in a coarse or a fine mode. If the system is in a fine mode, the $\beta_z$, $\omega_z$ signals are immediately applied to the Z direction check 171. The Z direction check determines the direction of the error by calculating the following signal:

$$\left[\frac{|\beta_z|}{\beta_z} + \frac{|\omega_z|}{\omega_z}\right]$$

If this signal is a positive error signal, the negative Z jet control 171 is energized and the negative Z-axis jet is pulsed. If the signal is a negative error signal, the positive Z jet control 173 is energized and the positive Z-axis jet is pulsed. When zero is achieved from this mathematic equation, either because the equation balances or because all factors reduce to zero, a signal is applied to the Z control check.

If the system is operating in a coarse mode, the output from the Z control check 165 is applied to the $\beta_z$, $\omega_z$ excessive check 167. If the $\beta_z$ and $\omega_z$ signals are above the predetermined value, then a signal is applied along the Yes line to the Z direction check and the appropriate Z jet is energized as above described. However, if the $\beta_z$ and $\omega_z$ signals are below the predetermined value, a No signal is applied along the No line to the Z control check 165. In this manner both a fine and a coarse mode of control is provided to handle varying requirements.

The Y-axis jet control network is identical to the Z-axis jet control network and comprises a Y control check 185; a $\beta_y$, $\omega_y$ excessive check 187, a Y direction check 189, a negative Y jet control 191, and a positive Y jet control 193. Similarly, the X-axis jet control network includes an X control check 197, a $\beta_x$, $\omega_x$ excessive check 199, an X direction check 201, a negative X jet control 203, and a positive X jet control 205. The various elements of the X and Y networks are connected in the operate in a manner similar to that of the Z-axis jet control.

It will be appreciated by those skilled in the art and others that the invention has provided a system that overcomes the disadvantages of the prior art. With respect to the gyro torquers, redundancy is inherent in the system due to the utilization of double-gimballed moment gyros. That is, if one gyro fails the other two gyros will compensate for the failed gyro. In addition, an envelope arrangement that locates the gyros along the three orthogonal axes of the craft to be stabilized and controlled allows lower launch weights and volumes than prior art systems. Further, the control system is relatively simple and does not produce excessive cross-coupling. Moreover, the system is highly reliable. By incorporating the advantages of a pulse jet stabilization and control system with a gyro stabilization and control system, the overall system can compensate for both constant and periodic disturbance torques. The gyro system controls attitude and implements attitude changes without the requirement of excessive fuel as would be required by a pulse jet system while the pulse jet system desaturates the gyro system when required due to the presence of constant external disturbance torques.

It will also be appreciated by those skilled in the art and others that numerous changes can be made in the system within the scope of the invention. For example, the control system illustrated in FIG. 1 compares the attitude and rate of the gimbals with the attitude and rate of the spacecraft. The system operates by utilizing sin and cos functions to obtain control signals. However, other trigonometric functions and other variable gains $k$ could also be utilized to provide the control signals. In addition, FIG. 4 illustrates one type of control system for controlling desaturation jets. However, other suitable sys-

What is claimed is:

1. Apparatus for controlling the attitude and stabilization of a space vehicle comprising:
   three double gimbal gyros, one gyro mounted along each of the three orthogonal axes of the space vehicle;
   spacecraft sensing means for sensing the rate and attitude of the space vehicle and for generating rate and attitude signals related to the rate and attitude of said space vehicle;
   gimbal sensing means for sensing the rate and attitude of the gimbals of said double-gimballed gyros and for generating signals related to the rate and attitude of said gimbals;
   comparing means connected to the outputs of said spacecraft sensing means and said gimbal sensing means for comparing the outputs of said spacecraft sensing means and said gimbal sensing means and for generating error signals related to the error between the rate and attitude sensed by said spacecraft sensing means and the rate and attitude sensed by said gimbal sensing means; and
   torquing means operatively connected to said comparing means and to the gimbals of said three double-gimballed gyros for torquing said gimbals in accordance with the error output of said comparing means.

2. Apparatus as claimed in claim 1 wherein each of said three double-gimballed gyros comprises a moment gyro having an inner gimbal and an outer gimbal and a flywheel located inside of said inner gimbal.

3. Apparatus as claimed in claim 2 wherein:
   said inner gimbal includes an inner gimbal tachometer and an inner gimbal angle potentiometer;
   said outer gimbal includes an outer gimbal tachometer and an outer gimbal angle potentiometer; and
   said torquing means includes an inner gimbal torquer and an outer gimbal torquer.

4. Apparatus as claimed in claim 3 wherein said inner gimbal also includes gimbal stops.

5. Apparatus as claimed in claim 4 wherein said spacecraft sensing means includes:
   a plurality of attitude error signal processing networks for generating angular error signals;
   a plurality of rate error signal processing networks for generating rate error signals; and
   amplifier and adder networks connected to the outputs of said attitude error sigal processing networks and said rate error signal processing networks in a predetermined manner to generate variable gain function signals.

6. Apparatus as claimed in claim 5 wherein said gimbal sensing means includes:
   a plurality of trigonometric function generators connected to the outputs of the angular potentiometers of said gimbals in a predetermined manner to generate sin and cos signals related to the angle signals generated by said angular potentiometers.

7. Apparatus as claimed in claim 6 wherein said comparing means includes a plurality of amplifier and adder networks for combining the variable gain signals generated by said spacecraft sensing means with the trigonometric signals generated by said gimbal sensing means in a predetermined manner.

8. Apparatus as claimed in claim 7 wherein said torquing means includes a plurality of gimbal torquer commands, said gimbal torquer commands connected to the outputs of said gimbal tachometers and the outputs of said comparing means for comparing said outputs.

9. Apparatus as claimed in claim 8 wherein said gimbal torquers of said gimbal torquing means are connected to the outputs of said gimbal torquer commands.

10. Apparatus as claimed in claim 1 wherein said spacecraft sensing means includes:
    a plurality of attitude error signal processing networks for generating angular error signals;
    a plurality of rate error signal processing networks for generating rate error signals; and
    amplifier and adder networks connected to the outputs of said attitude error sigal processing networks and said rate error signal processing networks in a predetermined manner to generate variable gain function signals.

11. Apparatus as claimed in claim 10 wherein said gimbal sensing means includes:
    angular potentiometers connected to the six gimbals of said three double-gimballed gyros for generating angular signals related to the location of said gimbals; and
    a plurality of trigonometric function generators connected to the outputs of said angular potentiometers in a predetermined manner to generate sin and cos signals related to the angle signals generated by said angular potentiometers.

12. Apparatus as claimed in claim 11 wherein said comparing means includes a plurality of amplifier and adder networks for combining the variable gain signals generated by said spacecraft sensing means with the trigonometric signals generated by said gimbal sensing means in a predetermined manner.

13. Apparatus as claimed in claim 12 wherein:
    said torquing means includes a plurality of gimbal torquer commands;
    said gimbal sensing means includes a plurality of gimbal tachometers; and
    said gimbal torquer commands comparing the outputs of said gimbal tachometers with the outputs of said comparing means.

14. Apparatus as claimed in claim 13 wherein said gimbal torquing means also includes a plurality of gimbal torquers connected to the outputs of said gimbal torquer commands and adapted to move said gimbals.

References Cited

UNITED STATES PATENTS

| | | | |
|---|---|---|---|
| 3,164,340 | 1/1965 | Slater et al. | 244—77 |
| 3,238,794 | 3/1966 | Wing | 74—5.34 |
| 3,329,375 | 7/1967 | Kurzhals et al. | 244—1 |

FERGUS S. MIDDLETON, Primary Examiner

U.S. Cl. X.R.

33—226; 74—5.34; 244—3.2